UNITED STATES PATENT OFFICE.

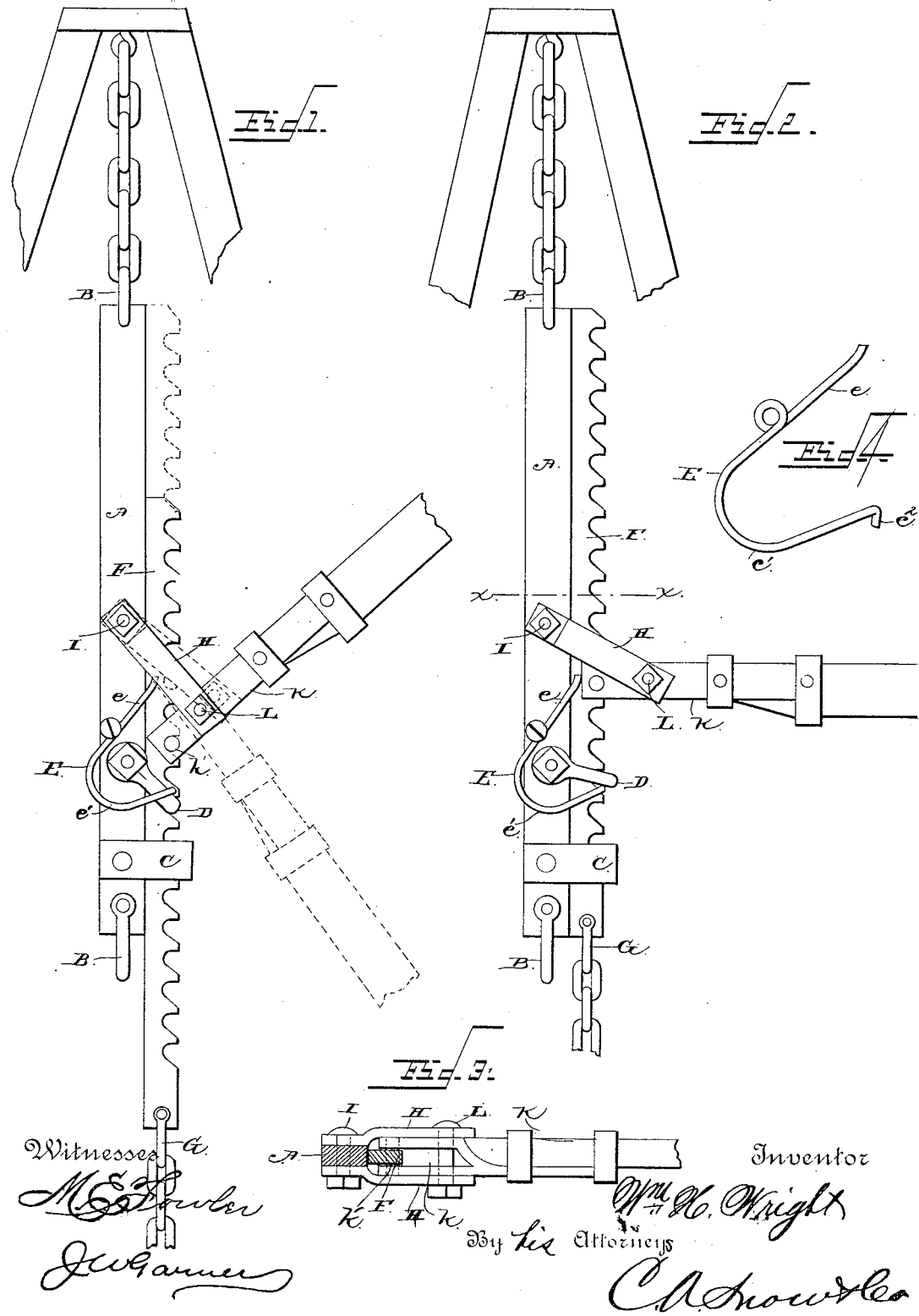

WILLIAM HARRISON WRIGHT, OF LACONIA, NEW HAMPSHIRE.

STUMP-EXTRACTOR.

SPECIFICATION forming part of Letters Patent No. 350,179, dated October 5, 1886.

Application filed June 3, 1886. Serial No. 204,076. (No model.)

*To all whom it may concern:*

Be it known that I, WILLIAM HARRISON WRIGHT, a citizen of the United States, residing at Laconia, in the county of Belknap and State of New Hampshire, have invented a new and useful Improvement in Stump-Extractors, of which the following is a specification.

My invention relates to an improvement in stump-extractors; and it consists in the peculiar construction and combination of devices, that will be more fully set forth hereinafter, and particularly pointed out in the claim.

In the drawings, Figure 1 is a side elevation of my invention engaged in the act of raising a stump or stone. Fig. 2 is a similar view of the same when adapted to lower the weight or stone to the ground. Fig. 3 is a transverse sectional view taken on the line $x\,x$ of Fig. 2. Fig. 4 is a detail view of the spring-arm.

A represents a vertical bar, which is provided at its upper and lower ends with links or rings B. Near the lower end of the bar A, and projecting from one side of the same, is a keeper, C.

D represents a detent or dog, which is pivoted to the bar A at a suitable distance above the keeper C, and extends from the same side of the said bar as the said keeper.

E represents a spring-lever, which is fulcrumed to the bar A, and is provided with an upwardly and outwardly projecting arm, $e$, which extends beyond the outer edge of the said bar A, and with a lower curved arm, $e'$, the outer end of which also projects beyond the outer edge of the bar A, and is provided with a transverse rib or projection, $e^2$. As shown in Fig. 1, the spring-arm $e'$ bears over the detent or dog D when the device is used for raising a stump or weight, and, as shown in Fig. 2, the spring-arm $e'$ bears under the detent or dog when the device is employed to lower a weight.

F represents a vertical ratchet-bar, which slides on the outer edge of the bar A, and is secured thereto by means of the keeper C and the detent or dog D, through which the said ratchet-bar passes. The ratchet-teeth of the said bar are on its outer side and incline downwardly, and one of the said teeth is normally engaged by the dog or detent, thereby preventing the said ratchet-bar from becoming disengaged from the bar A. To the lower end of the ratchet-bar is attached a ring or link, G.

H represents a pair of link-arms, which are pivoted at one end to the bar A at a suitable distance above the fulcrum of the spring-lever E by a bolt, I. In between the outer ends of the said link-arms is fulcrumed the inner end of a hand-lever, K, by means of a bolt, L. The said hand-lever has its inner end bifurcated, thereby forming a slot, $k$, to receive the toothed edge of the bar F, and projecting across the said slot is a pin, $k'$, to engage with the said teeth of the ratchet-bar successively.

The operation of my invention is as follows: The device is suspended from the tripod or other suitable supporting-frame by a rope or chain, which is attached to the upper ring or link, B, of the bar A, and the stump to be extracted or weight to be raised is attached by means of a chain or rope to the link or ring G at the lower end of the ratchet-bar. The lower arm, $e'$ of the spring-lever E engages with the outer side of the dog or detent, as shown in Fig. 1, and as previously described, and the upper arm, $e$, of the said spring-lever extends upwardly and outwardly across one side of the ratchet-bar. The pin at the inner end of the hand-lever K engages one of the teeth of the said ratchet-bar, and by pulling down upon the outer end of the said lever the ratchet-bar is raised to the position indicated in dotted lines in Fig. 1, thereby raising the ratchet-bar, and the dog or detent drops into engagement with another tooth of the ratchet-bar, thus supporting the same while the hand-lever is being raised in order to take a fresh hold.

In order to lower a weight, the lower arm, $e'$, of the spring-lever is caused to engage with the under side of the dog or detent, as shown in Fig. 2. The hand-lever is then caused to engage with a tooth of the ratchet-bar, as before, and its inner end bears against the upper arm, $e$, of the spring-lever. The outer end of the hand-lever is first lowered sufficiently to cause the inner end thereof to rise, and by bearing against the arm $e$ of the spring-lever trip the same and cause it to raise the detent or catch from engagement with the ratchet-bar, thus permitting the same to be lowered a distance corresponding to the width of one tooth. The inner end of the hand-lever descends as the outer end thereof is raised in order to lower the ratchet-bar, and thereby releases the spring-lever, and causes the dog or detent to drop into engagement with the ratchet-bar, when the operation above described is repeated until the weight has been lowered to the ground.

Having thus described my invention, I claim—

The combination, in a stump-extractor, of the bar A, the sliding ratchet-bar, the detent or dog pivoted to the bar A to engage the teeth of the ratchet-bar, the pivoted spring-lever E, having the upper arm, $e$, and the lower arm, $e'$, adapted to engage either side of the dog or detent, the link-arms having their upper ends pivoted to the bar A, and the hand-lever pivoted to the lower end of the link-bars and adapted to engage the teeth of the ratchet-bar, and also the arm $e$ of the spring-lever, for the purposes set forth, substantially as described.

In testimony that I claim the foregoing as my own I have hereto affixed my signature in presence of two witnesses.

WILLIAM HARRISON WRIGHT.

Witnesses:
C. E. LEAVITT,
A. W. WILCOX.